US006829515B2

(12) United States Patent
Grimm

(10) Patent No.: US 6,829,515 B2
(45) Date of Patent: Dec. 7, 2004

(54) METHOD AND DEVICE FOR DETERMINING CHANGES IN TECHNICAL SYSTEMS SUCH AS ELECTRIC MOTORS CAUSED BY AGEING

(75) Inventor: Wolfgang Grimm, Allison Park, PA (US)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 09/969,083

(22) Filed: Oct. 1, 2001

(65) Prior Publication Data

US 2002/0107589 A1 Aug. 8, 2002

(30) Foreign Application Priority Data

Sep. 29, 2000 (DE) .......................... 100 48 826

(51) Int. Cl.⁷ .............................................. G06F 19/00
(52) U.S. Cl. ........................... 700/108; 700/52; 700/73; 700/170
(58) Field of Search .............................. 700/90, 21, 54, 700/170, 108, 105, 52, 73; 701/101; 702/78

(56) References Cited

U.S. PATENT DOCUMENTS

| 5,303,580 A | * | 4/1994 | Schneider et al. ......... 73/118.1 |
| 5,646,540 A | * | 7/1997 | Stals et al. .................. 324/691 |
| 5,790,412 A | * | 8/1998 | Su .............................. 702/78 |
| 5,857,163 A | * | 1/1999 | Trombley et al. ........... 701/101 |
| 2002/0161457 A1 | * | 10/2002 | Hershey et al. ............... 700/21 |

FOREIGN PATENT DOCUMENTS

| DE | 195 16 481 | 11/1996 | |
| DE | 197 16 520 | 11/1998 | |
| GB | 0 411 873 A2 | * 6/1991 | ........... G06F/15/60 |
| GB | 2324380 A | * 10/1998 | ........... G01R/31/34 |
| JP | 2000-323987 | * 11/2000 | ............. H03L/7/14 |

OTHER PUBLICATIONS

Stone, G., The Statistics of Aging Models and Practical Reality, Oct. 5, 1993, IEEE Transaction on Electrical Insulation, 716–28.*

* cited by examiner

Primary Examiner—Anthony Knight
Assistant Examiner—Ronald D. Hartman, Jr.
(74) Attorney, Agent, or Firm—Kenyon & Kenyon

(57) ABSTRACT

A method and a device are proposed for determining parameters describing changes in a technical system caused by ageing, usage-dependent performance quantities being ascertained in the system. In this context, using a wear and tear model, a correlation is produced between the ascertained performance quantities and the parameters describing changes in the system caused by ageing, and subsequently these parameters, or quantities derived therefrom, such as remaining service life, probability of malfunction, or quality of a product, calculated internal to the system at any point of time as desired.

10 Claims, 2 Drawing Sheets

METHOD AND DEVICE FOR DETERMINING CHANGES IN TECHNICAL SYSTEMS SUCH AS ELECTRIC MOTORS CAUSED BY AGEING

FIELD OF THE INVENTION

The present invention relates to a method and a device for determining parameters describing changes in a technical system caused by ageing, particularly for a system including one or more electric motors, usage-dependent performance quantities being determined in the system. The present invention also relates to a computer program and a computer program product, in each case having a program-code arrangement, in order, when they are executed on a computer or a computing unit, to permit ageing parameters of a system to be determined.

BACKGROUND INFORMATION

The determination of changes in a system caused by ageing is important for an adaptive control of various electromechanical components as are encountered, for example, in a motor vehicle (e.g., fuel-injection systems), and can also be used to estimate the wear and tear and the remaining service life of motors in electric tools or generators, for example.

German Published Patent Application No. 197 16 520 describes a device for determining performance quantities of electric motors, in which certain usage-dependent performance quantities such as temperature, number of motors start-ups and operating hours are determined and stored. Using an external readout device, the recorded data can be read out and interpreted. Conclusions can then be drawn as to whether after the service life of a product has expired, the electric motor used in the product can be further used in a new product.

German Published Patent Application No. 195 16 481 describes a device for acquiring, storing and outputting data of a control unit in a motor vehicle, with which, in addition to the operating time of the control unit, further data are acquired which are able to give information with respect to the probability of malfunction or the future reliability of the control unit. Among these data are, for example, extreme temperature values, as well as extreme voltage values and their duration. The document indicated does not describe how conclusions about the probability of malfunction or reliability of the control unit are drawn from the specified data.

Parameter-estimation methods also exist based on neural networks or on extended Kalman filters which, till now, have been used successfully, inter alia, for identifying friction in actuating systems. These methods can only be used conditionally for predicting wear conditions, for identifying wear parameters and for estimating the remaining service life of products. When the identification task is multi-dimensional, they often fail, and guarantee no or not a sufficiently fast convergence.

Therefore, the intention of the present invention is to indicate an identification method, which can be implemented on-line, for determining changes in parameters describing a technical system caused by ageing, as well as a device suitable for carrying the method into effect and a corresponding computer program (product).

SUMMARY OF THE INVENTION

Using the method of the present invention, parameters which describe changes in a system caused by ageing can be calculated within the system during the entire operating time of the system. To that end, with the aid of a wear and tear model, first of all a correlation is produced between the usage-dependent and measurable performance quantities detected in the system, and the ageing-inherent, but not directly measurable parameters characterizing the wear and tear or the ageing. From this wear and tear model, the parameters describing the changes in the system caused by ageing, or quantities derived therefrom, can then be calculated, which are made available in the system.

A device of the present invention for determining parameters which describe changes caused by ageing in a technical system has a unit to which the usage-dependent performance quantities determined in the system are supplied. Taking as a basis the aforesaid wear and tear model, the ageing parameters or quantities derived therefrom are then calculated in this unit within the system. The described unit can be regarded as a component of a computer or—particularly in the case of motor vehicles—of a control unit. In the following, the same considerations can also be brought to bear on all parts subject to wear and ageing, whether in vehicles, airplanes or even in the producer-goods and/or consumer-durables sector, etc. Thus, on this matter, the exemplary embodiments are not to be understood as restriction of the subject matter according to the present invention.

The indicated parameters or the quantities derived therefrom can be calculated continually or at pre-definable time intervals. Depending upon the field of application and system class, the result of the parameter calculation can be displayed visually, by output of a numerical value or a warning, or acoustically. However, the result can also be made available to the control unit of the system to permit control of the system adapted to the operating time or to ageing processes.

Frequently, the indicated wear and tear model can be represented in the form $$f=f(p,x(t),a(t))=0 \quad (1)$$

the generally vectorial quantities f, p, a and x representing the following:

x(t) describes usage-dependent and measurable performance quantities of a system or product, such as use-dependent internal state variables, e.g. temperature, current, power consumption and/or acceleration, as well as number of switch-on cycles and total operating time.

a(t) describes usage-dependent, not directly measurable parameters, which, because of wear and ageing with increasing use of a system or product, change with time t, such as parameters for describing catalysis properties of a catalytic converter, absorption properties of an absorber or filter, or even the increasing probability of malfunction or the decreasing remaining service life of a product. The knowledge of these parameters allows for assessing product wear and for adaptive tuning of control algorithms in control units.

p describes usage-independent, system-immanent, not directly measurable parameters which describe substance properties of a system or product class (system constants). Since for individual products these parameters p can be subject to fluctuations depending on manufacture, they represent average values for the class of products considered.

A system in which the acquired, usage-dependent performance quantities can be retrieved external to the system is described in German Published Patent Application No. 197

16 520 indicated. In one embodiment of the present invention, for a plurality of systems which belong to one common class, the respective acquired performance quantities are retrieved externally after a specific usage time which can be different from system to system. For example, this can take place at regular time intervals, or always when the system or product is brought to a service place for inspection, repair or waste disposal. From the acquired performance quantities $x_k(t)$ of the k-th system, after a usage time $t_k$, optionally after additional measurements of the wear and tear of the used products, ageing parameters $a_k(t_k)$ can be determined which describe ageing-inherent changes in the system that are not directly measurable. By inserting ascertained performance quantities $x_k(t)$ and the determined ageing parameters $a_k(t_k)$ into wear and tear model $f_k$ of a system indicated in equation (1), a parameter vector p, which includes P usage-independent system-immanent parameters (A, B, . . . ), can now be calculated as average value of the system class.

A device suitable for determining the wear and tear model of a system class has a readout unit through which stored performance quantities are read out for a number of K systems of a system class, and, together with the ageing parameters determined therefrom, are supplied to a computing unit. The parameter vector p is then calculated in the computing unit in order to obtain a completely determined wear and tear model.

In particular, for each k-th product, a wear and tear model $$f_k = f(p, a_k(t_k), x_k(t)) = 0, k=1, \ldots, K, \qquad (2)$$

can be formulated, and the parameter vector p=p* can be determined as solution of the equation system. For K>P, a redundant, generally non-linear equation system is formed which can be solved by a suitable optimization method that, in particular, should supply good approximate values for K>>P. The result is an approximation for the parameter vector p=p* for the class of systems or products considered.

At this point, the ascertained parameter vector p=p* can be inserted into the wear and tear model f of equation (1), so that the wear and tear model for the system or product class in question is completely known, at least in a good approximation. The wear and tear model can be stored in the system and calculated continuously during the service life, so that system-internal statements are possible concerning the wear or ageing.

In this context, in order to minimize the on-line computing time, it may be useful to solve the wear and tear model directly according to ageing parameters a(t) with the aid of mathematical methods such as power series statements or recursive methods.

After implementing the method of the present invention in the system, the instantaneous values of performance quantities x(t) can be read in afresh in each measuring cycle for determining ageing parameters a(t) and can be overwritten again in the next measuring cycle, so that it is not necessary to store these values over the entire operating time.

All calculations described can expediently be carried out by a computer program which is executed on a suitable computing unit. For example, for continuous on-line determination of the ageing parameters, a unit can be provided in the system to which the acquired, usage-dependent performance quantities are supplied that are then evaluated in a computing unit. The corresponding computer program works with a predetermined wear and tear model. This wear and tear model is expediently also determined by a computer program, which can be advantageous, particularly given the occurrence of non-linear equation systems. The computing unit for this is accommodated in a device external to the system, in order to be able to process data from a totality of systems.

The computer programs can be stored on suitable storage media such as EEPROMs, flash memories, but also CD ROMs, diskettes or hard disk drives.

The recording and evaluation, according to the present invention, of historical load patterns permits the detection of changes in a total system or its components (e.g., motor vehicle or electric tool) caused by ageing, and therefore, in the next step, for instance, an adaptation of algorithms in control units to new conditions, an early warning in the case of safety-critical systems, the specification of a degree of wear for determining servicing intervals, or an ageing-dependent reuse of used components, and more of a similar nature.

If reliable wear and tear models are found which cover all conceivable defects, the method of the present invention makes it possible to make reliable statements about the degree of wear and the remaining service life at any point of time as desired, without the system or its components having to be inspected in so doing. The frequently used MTBF (mean time between failures) data cannot supply this information if the usage intensity is not known a priori. If, when using the method of the present invention, a specific remaining service life (taking into consideration a safety factor) or a critical degree of wear is reached, a system-internal control unit calculates the point of time for a product or component exchange and recommends it automatically. This can be useful for motor vehicles, particularly in the case of service-station visits within the framework of service intervals, as well.

For example, after taking back products from pilot production and test series, or after equipment defects, the manufacturer on its part receives valuable information about actual load profiles which supply valuable information for the quality assurance and for determining MTBF.

DETAILED DESCRIPTION

Figure 1:
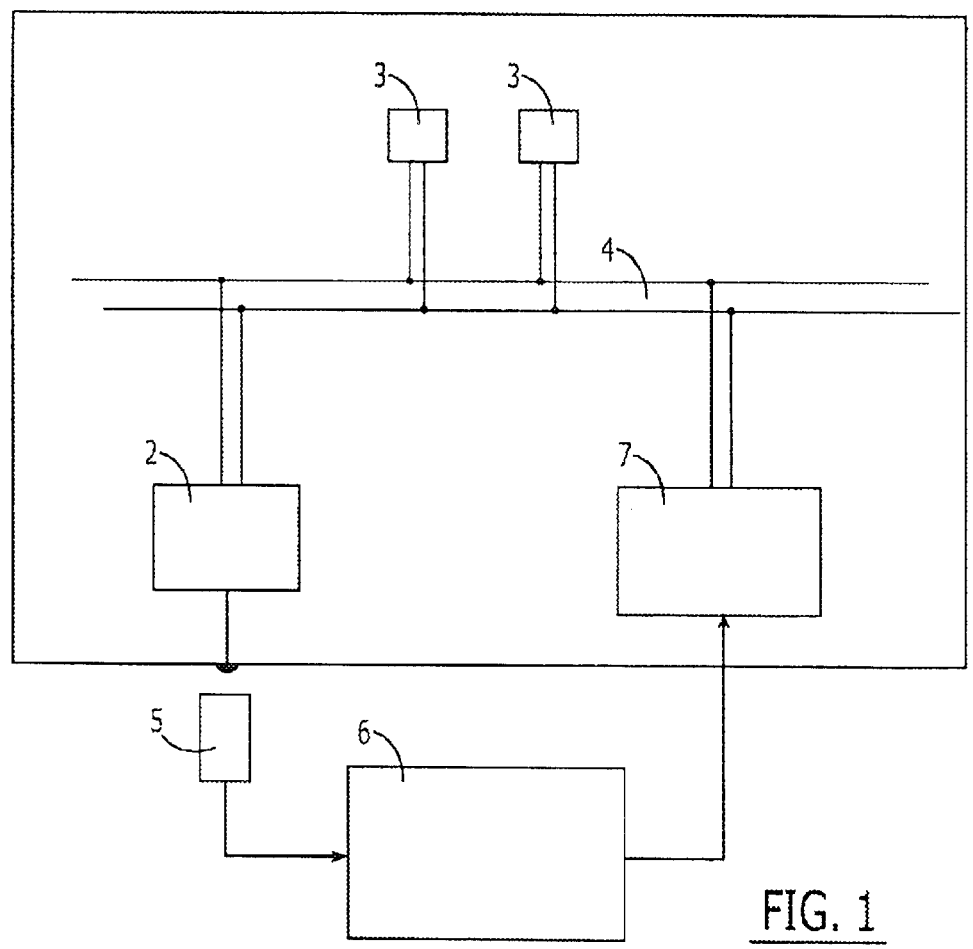
FIG. 1 shows schematically a device for detecting, according to the present invention, changes in a system caused by ageing, the intention in this exemplary embodiment being to estimate the remaining service life of electric motors on the basis of temperature influences.

FIG. 1 shows schematically a design for implementing the method of the present invention. Examples of application for this, in addition to electric motors, are also other electromechanical components such as, for example, fuel injection systems in motor vehicles, or, quite generally, as already mentioned, electrical/mechanical devices which are subject to ageing caused by usage. As technical system of a considered class, e.g. electric motors in electric tools, in motor-vehicle starters or in motor-vehicle generators, in the following the k-th product 1 is considered as representative of this system class, only the components for implementing the method of the present invention being shown here. In the following, the method of the present invention is intended to supply an estimation of the remaining service life of the electric motors contained in the products mentioned.

To this end, first of all the temperature is measured with one or more (already present) temperature sensors 3 in the armature winding or at the pole shoe of the motor, and the history of temperature values $T_k(t)$, the number of switch-on cycles and the total operating time are stored as usage-dependent performance quantities of the system. The storage takes place in a k-th performance-data memory 2, integrated into each k-th product 1, for a number of k=1, ... ,K products. A memory such as an EEPROM, flash memory, inter alia, but also a CD-ROM, diskette, etc. is suitable as performance-data memory 2.

To detect the switch-on of a motor, it is possible to switch the entire performance-data memory into the electric circuit of the motor, so that each time the motor is switched on, the supply voltage of the monitoring device is switched in simultaneously. To ensure reliable writing of the data after the motor is switched off, a capacitor can be switched into the voltage supply of the monitoring device which prevents an immediate voltage drop after switching off the motor and thus permits a reliable program termination.

The running time of the motor in each switch-on cycle can be determined via a program loop with the aid of the microprocessor timer. The total running time is determined by adding the individual switch-on times.

The acquired data are permanently stored in a non-volatile data memory (EEPROM) over the entire service life. In one development, to reduce the memory requirements for this, the value ranges of the ascertained performance quantities are segmented into specific classes and the number of the occurrence is stored per class. In another embodiment, it is possible to log only the exceeding of threshold values and the associated duration of this exceeding. In all the embodiments represented, the individual load profile of the motor since the first start-up can be comprehended.

To be able to completely define the wear and tear model, first of all the performance quantities stored in performance-data memory 2 are output via a readout device 5 according to equipment defect. The stored performance quantities can be read out, depending on product class and the ageing parameter to be determined, at other points of time (repair, inspection, etc.), as well. For the data readout, a microcontroller integrated into performance-data memory 2 sends all values contained in the data memory via an output (e.g., plug connector, infrared diode, wireless) to readout device 5. In another design, readout device 5 can also be connected to a bus system. Readout device 5 is further connected, for example, via a serial interface, to a computer (PC or laptop) 6. The performance quantities of each k-th product, thus, the stored total operating time $\tau_k$, the number of switch-on cycles and the history of temperature values $T_k(t), k=1, \ldots ,K$, are stored in a database on computer 6. In so doing, the reason for malfunction is determined and stored for each k-th motor, as well. Only the thermal defects shall be further considered in the following as reason for malfunction, for which a wear and tear model is specified further below.

As ageing parameter $a(t)$, the service life of the system is used, thus, in this case, the measured total operating time up to the defect of the k-th product on the basis of a motor malfunction because of temperature influences. Thus, for the k-th product, $a_k(t_k)=\tau_k$. Naturally, the remaining service life in the case of the device defect is zero.

As a special wear and tear model, for this exemplary embodiment, the following function $f_k$ for the k-th product can be formulated:

$$f_k = f(p, a_k, x_k(t_i)) = \frac{1}{A} \sum_{i=1}^{N_k} e^{\frac{B}{T_k(t_i)}} \Delta t - 1 = 0 \quad (3)$$

In this case, parameter vector p=(A,B) represents system-immanent parameters A, B. Temperature data $T_k(t_i)$ designate temperatures in the k-th system measured at stipulated, equidistant points of time $t=t_i(i=1, \ldots ,N_k)$ with measuring intervals $\Delta_t$, so that valid for the measured service life is: $a_k(t_k)=\tau_k=N_k\Delta t$.

To ascertain parameter vector p with unknowns A and B, the set of K non-linear equations for all k-products (k=1, ... ,K) is solved according to unknowns A and B by using the so-called Nelder-Meade algorithm. The result is an approximation for parameter vector $p=p^*=(A^*,B^*)$ for the class of products considered.

Thus, the above wear and tear model for the product class being considered is completely defined, and interesting wear and tear quantities can now be defined and calculated. The defined wear and tear model, or wear and tear quantities derived from it, can be transferred via a computer 6 to an identification unit 7 located, for example, in a control unit. The measured quantities for this are transferred to control unit 7 via a data line 4, from which, in the identification unit of k-th product 1, for example, the following wear and tear parameter can be calculated on-line, that is to say, internal to the system:

$$V_n = \frac{1}{A^*} \sum_{i=1}^{n} e^{\frac{B}{T(t_i)}} \Delta t \quad (4)$$

where n<N. The above-indicated wear and tear model of equation (3) is satisfied at the end of the product service life because of a temperature defect precisely when n=N, that is to say $$V_n = \frac{1}{A^*} \sum_{i=1}^{N} e^{\frac{B^*}{T(t_i)}} \Delta t = 100\% \quad (5)$$

Thus, $V_n$ describes the product service life already used up in percentage, which can now be calculated by approximation in a relatively simple manner on-line with a microcontroller in a control unit. Instead of service life $\tau$ the product service life used up is utilized here as wear and tear parameter, since the wear and tear model in equation (3) cannot be solved directly according to service life $\tau=N\Delta t$.

An effective calculation of $V_n$ which saves memory space can be carried out in recursive form according to $$V_n = V_n - 1 + \frac{\Delta t}{A^*} e^{\frac{B^*}{T(t_n)}} \quad (6)$$

where $V_0=0$. Values $T(t_n)$ are overwritten in the identification unit after each new n-th measurement.

An effective on-line calculation of the e-function in equation (4) or (6) can utilize a functionality present in the target processor, or be carried out by approximation with a polynomial function or simply as a power exponential series.

Figure 2:
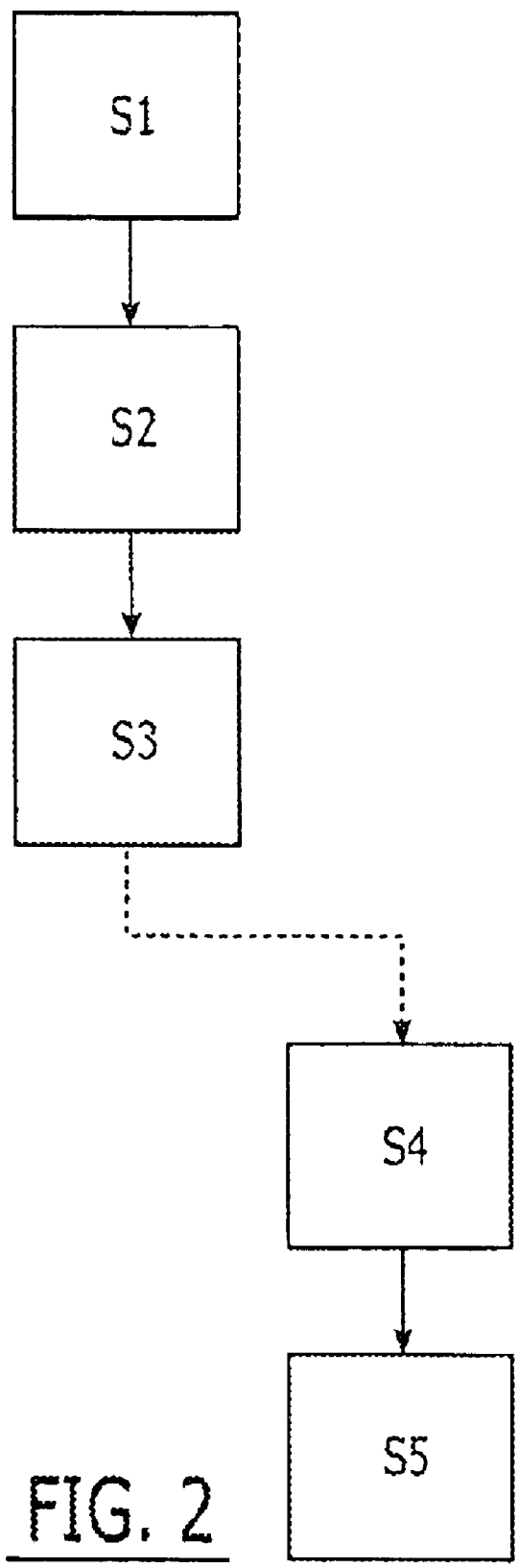
FIG. 2 shows schematically as a flowchart the steps to be executed in the method of the present invention.

FIG. 2 shows schematically five main steps for implementing the present invention.

In step S1, the usage profiles of a number K of technical systems or products are acquired in the form of performance quantities (particularly sensor values) and are stored in performance data memories incorporated in the respective products. In step S2, the stored performance quantities are read out at a specific point of time, and from them, the ageing parameters for the respective systems are determined. In step S3, system-immanent parameters which are yet unknown are subsequently calculated with the aid of the now-available data of all K products and a wear and tear model. Steps S2 and S3 are expediently carried out using an external computer which can be connected via a suitable readout device to the performance-data memories of the respective products.

After the wear and tear model of the system class considered has been completely determined, an off-line transfer of the calculated system-immanent parameters or of the entire wear and tear model is effected to the individual identification units accommodated in the products (step S4). For example, in this context, by transferring instantaneously calculated system-immanent parameters at certain times, the wear and tear model already stored in an identification unit can be corrected. In step S5, the respective ageing parameters of a system can subsequently be calculated on-line by the system-internal identification unit for the individual, different loads (usage profiles) of the products.

Steps S1 through S3 are expediently executed by a computer program in a computer external to the system, while steps S4 and S5 can be executed in a computing unit internal to the system.

The present invention makes it possible, both for the consumer, but also for the manufacturer and for servicing operations, to quickly obtain information about product-specific parameters which indicate the changes in a product caused by ageing, without themselves being directly measurable. On the basis of this information, it can be decided whether a product can still be recycled, i.e. further used in another system, whether expensive repairs are still worthwhile, or what is the instantaneous quality of the product. The latter can have crucial significance, particularly in the case of safety-critical systems. The method of the present invention makes it possible to receive this information from the system or product itself, without external, additional processing units being necessary. Finally, the present invention permits adaptive control of systems, for example, the adaptive control of air-fuel mixtures for emissions control.

Formulas Used:

$$f = f(p, x(t), a(t)) = 0 \quad (1)$$

$$f_k = f(p, a_k(t_k), x_k(t)) = 0, \; k=1, \ldots, K, \quad (2)$$

$$f_k = f(p, a_k, x_k(t_i)) = \frac{1}{A} \sum_{i=1}^{N_k} e^{\frac{B}{T_k(t_i)}} \Delta t - 1 = 0 \quad (3)$$

$$V_n = \frac{1}{A^*} \sum_{i=1}^{n} e^{\frac{B^*}{T(t_i)}} \Delta t \quad (4)$$

$$V_n = \frac{1}{A^*} \sum_{i=1}^{N} e^{\frac{B^*}{T(t_i)}} \Delta t = 100\% \quad (5)$$

$$V_n = V_n - 1 + \frac{\Delta t}{A^*} e^{\frac{B^*}{T(t_n)}} \quad (6)$$

What is claimed is:

1. A method for determining a parameter a(t) describing a change in a technical system caused by ageing, comprising the steps of:
   determining a usage-dependent performance quantity x(t) in the technical system;
   in accordance with a wear and tear model, producing a correlation between the determined usage-dependent performance quantity and the parameter a(t); and
   calculating internal to the technical system one of: i) the parameter a(t), and ii) a quantity derived from the parameter a(t);
   wherein:
      the determined usage-dependent performance quantity x(t) is retrievable external to the technical system,
      the wear and tear model is given by f=f(p,x(t),a(t))=0, a parameter vector p represents a usage-independent, system-immanent parameter, and the determined usage-dependent performance quantity $x_k(t)$ is retrieved external to the technical system after a usage time for each of K technical systems of a same technical class, and
      from the usage time, for each of the K technical systems, a corresponding parameter $a_k(t_k)$ characterizing one of a wear and an ageing is determined and the parameter vector p for the technical system class is subsequently determined from K wear and tear models of the K technical systems, for k=1, . . . ,K.

2. The method according to claim 1, further comprising the steps of:
   given the K technical systems, formulating an equation system $f_k$=f(p,$x_k$(t),$a_k$($t_k$))=0,k=1, . . . ,K; and
   determining parameter vector p=p*, corresponding to an approximation for the technical system class considered, as a solution for K≧P, P representing a number of parameters of the parameter vector p.

3. The method according to claim 1, further comprising the step of:
   storing the wear and tear model in a control unit of the technical system.

4. The method according to claim 1, further comprising the steps of:
   periodically calculating, from the determined usage-dependent performance quantity and the wear and tear model, the one of: i) the parameter a(t), and ii) the quantity derived from the parameter a(t);
   storing an instantaneous value of the one of: i) the parameter a(t), and ii) the quantity derived from the parameter a(t)); and
   periodically overwriting the determined usage-dependent performance quantity x(t).

5. A device for determining a parameter a(t) describing a change in a technical system caused by ageing, comprising:
   an arrangement for ascertaining a usage-dependent performance quantity x(t) in the technical system; and
   a unit, internal to the technical system, to which the ascertained, usage-dependent performance quantity x(t) can be supplied, and in which one of: i) the parameter a(t), and ii) a quantity derived from the parameter a(t), is able to be calculated in accordance with a wear and tear model that produces a correlation between the ascertained usage-dependent performance quantity x(t) and the parameter a(t);
   wherein the ascertained, usage-dependent performance quantity is retrievable external to the technical system;
   wherein the wear and tear model is given by f=f(p,x(t),a(t))=0, a parameter vector p represents a usage-independent, system-immanent parameter, and the ascertained usage-dependent performance quantity $x_k(t)$ is retrieved external to the technical system after a usage time for each of K technical systems of a same technical class, and wherein from the usage time, for each of the K technical systems, corresponding parameter $a_k(t_k)$ characterizing one of a wear and an ageing is determined d the parameter vector p for the technical system class is subsequently determined from K wear and tear models of the K technical systems, for k=1, . . . ,K.

6. The device according to claim 5, further comprising:
a performance-data memory for storing the ascertained usage-dependent performance quantity x(t).

7. A computer-readable storage medium for storing a program that when executed causes a computer to perform the steps of:
determining a usage-dependent performance quantity x(t) in a technical system;
in accordance with a wear and tear model, producing a correlation between the determined usage-dependent performance quantity x(t) and a parameter a(t) describing a change in the technical system caused by ageing; and
calculating internal to the technical system one of: i) the parameter a(t), and ii) a quantity derived from the parameter a(t);
wherein the ascertained, usage-dependent performance quantity is retrievable external to the technical system;
wherein the wear and tear model is given by f=f(p,x(t))=0, a parameter vector p represents a usage-independent, system-immanent parameter, and the ascertained usage-dependent performance quantity $x_k(t)$ is retrieved external to the technical system after a usage time for each of K technical systems of a same technical class, and
wherein from the usage time for each of the K technical systems, a corresponding parameter $a_k(t_k)$ characterizing one of a wear and an ageing is determined and the parameter vector p for the technical system class is subsequently determined from K wear and tear models of the K technical systems, for k=1, . . . ,K.

8. A device for determining a wear and tear model (f), given by f=f(p, x(t), a(t))=0, with a parameter vector p representing a usage-independent, system-immanent parameter of a system class, the device comprising:
a readout device for reading out a performance quantity x(t) that is ascertained and stored in K systems of the system class over a usage time, from which parameters a(t) belonging to each of the K systems and characterizing one of a wear and an ageing are able to be determined (k=1, . . . , K); and
a computing unit for calculating the parameter vector p for the system class from the K wear and tear models;
wherein the ascertained, usage-dependent performance quantity is retrievable external to the technical system;
wherein the wear and tear model is given by f=f(p,x(t),a(t))=0, a parameter vector p represents a usage-independent, system-immanent parameter, and the ascertained usage-dependent performance quantity $x_k(t)$ is retrieved external to the technical system after a usage time for each of K technical systems of a same technical class, and
wherein from the usage time, for each of the K technical systems, a corresponding parameter $a_k(t_k)$ characterizing one of a wear and an ageing is determined and the parameter vector p for the technical system class is subsequently determined from K wear and tear models of the K technical systems, for k=1, . . . ,K.

9. A computer-readable storage medium for storing a program that when executed causes a computer to perform the steps of:
determining a usage-dependent performance quantity x(t) in a technical system;
in accordance with a wear and tear model, producing a correlation between the determined usage-dependent performance quantity x(t) and a parameter a(t) describing a change in the technical system caused by ageing; and
calculating internal to the technical system one of: i) the parameter a(t), and ii) a quantity derived from the parameter a(t) wherein:
the determined usage-dependent performance quantity x(t) is retrievable external to the technical system,
the wear and tear model is given by f=f(p,x(t),a(t))=0, a parameter vector p represents a usage-independent, system-immanent parameter, and the determined usage-dependent performance quantity $x_k(t)$ retrieved external to the technical system after a usage time for each of k technical systems of a same technical class, and
from the usage time, for each of the K technical systems, a corresponding parameter $a_k(t_k)$ characterizing one of a wear and an ageing is determined and a parameter vector p for the technical system class is subsequently determined from K wear and tear models of the K technical systems, for k=1, . . . ,k.

10. A computer-readable storage medium for storing a program that when executed causes a computer to perform the steps of:
determining a usage-dependent performance quantity x(t) in a technical system;
in accordance with a wear and tear model, producing a correlation between the determined usage-dependent performance quantity x(t) and a parameter a(t) describing the change in the technical system caused by ageing;
calculating internal to the technical system one of: i) the parameter a(t), and ii) a quantity derived from the parameter a(t); and
given K technical systems, formulating an equation system $f_k$=f(p,$x_k$(t),$a_k(t_k)$)=0, for k=1, . . . ,K, and parameter vector p=p* as an approximation for a technical system class considered is determined as a solution for K≧P, P representing a number of parameters of the parameter vector p, wherein:
the determined usage-dependent performance quantity x(t) is retrievable external to the technical system,
the wear and tear model is given by f=f(p,x(t),a(t))=0, the parameter vector p represents a usage-independent, system-immanent parameter and the determined usage-dependent performance quantity $x_k(t)$ is retrieved external to the technical system after a usage time for each of K technical systems of a same technical class, and
from the usage time, for each of the K technical systems, a corresponding parameter $x_k(t_k)$ characterizing one of a wear and an ageing is determined and the parameter vector for the technical system class is subsequently determined from K wear and tear models of the K technical systems, for k=1, . . . ,K.

* * * * *